(12) United States Patent
Westermann

(10) Patent No.: US 8,066,301 B1
(45) Date of Patent: Nov. 29, 2011

(54) PERSON TRANSPORTING APPARATUS AND METHOD

(76) Inventor: Karl Westermann, Round Rock, TX (US)

( * ) Notice: Subject to any disclaimer, the term of this patent is extended or adjusted under 35 U.S.C. 154(b) by 0 days.

(21) Appl. No.: 12/859,718

(22) Filed: Aug. 19, 2010

(51) Int. Cl.
*B62B 3/02* (2006.01)
(52) U.S. Cl. .................. 280/657; 280/47.38; 280/304.1; 5/86.1
(58) Field of Classification Search ............... 280/250.1, 280/638, 640, 643, 647, 657, 47.34, 47.38, 280/304.1; 297/DIG. 4; 5/81.1 R, 83.1, 5/86.1, 81.1 HS
See application file for complete search history.

(56) References Cited

U.S. PATENT DOCUMENTS

| | | | |
|---|---|---|---|
| 4,010,499 A * | 3/1977 | Davis et al. ...................... | 5/87.1 |
| 5,058,221 A | 10/1991 | Abraham | |
| 5,667,235 A | 9/1997 | Pearce et al. | |
| 5,713,591 A | 2/1998 | Zarkhin et al. | |
| 5,884,929 A * | 3/1999 | Kincaid ...................... | 280/304.1 |
| 7,827,630 B2 * | 11/2010 | Bostelman et al. .............. | 5/87.1 |
| 2004/0163173 A1 * | 8/2004 | Downing ........................ | 5/86.1 |
| 2004/0251656 A1 * | 12/2004 | Patterson et al. .......... | 280/304.1 |
| 2008/0106060 A1 | 5/2008 | Knopf | |
| 2008/0129006 A1 | 6/2008 | Johnson et al. | |

* cited by examiner

*Primary Examiner* — John Walters
(74) *Attorney, Agent, or Firm* — Hulsey, P.C.; William N. Hulsey, III; Loren T. Smith

(57) ABSTRACT

The apparatus of the present disclosure is an improvement on known wheelchairs and other known devices for transporting elderly, infirm, injured, handicapped, disabled, or otherwise mobility-impaired individuals. The present disclosure provides a seat that is adjustable in both height and tilt angle for easy loading and unloading. In some embodiments, the height adjustment is provided via a hydraulic lift cart. Further provided are adjustable horizontal leg supports. A non-confining cage of substantially vertical support bars surrounds the occupant, and straps may be attached around the support bars. This provides support without causing the occupant to feel strapped down and confined to the device. Removing the straps allows easy loading and unloading from whichever side of the apparatus is most convenient.

14 Claims, 9 Drawing Sheets

FIG. 6 (PHOTOGRAPH)

FIG. 8 (PHOTOGRAPH)

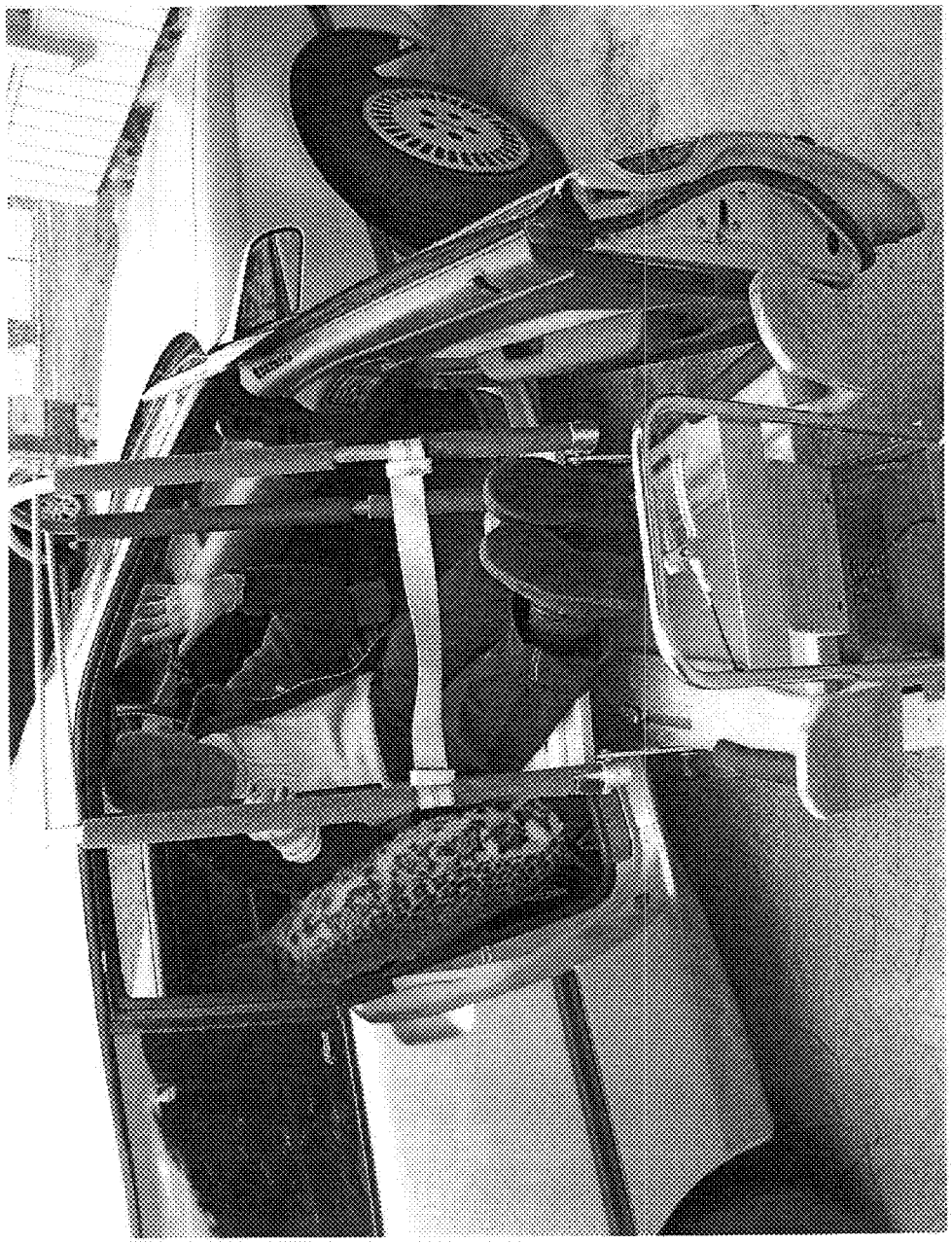
FIG. 9 (PHOTOGRAPH)

PERSON TRANSPORTING APPARATUS AND METHOD

FIELD

This disclosure relates generally to the field of devices designed for use by elderly, infirm, injured, handicapped, disabled, or otherwise mobility-impaired individuals. More specifically, the present disclosure relates to individuals who may have trouble moving autonomously, including moving between a wheelchair-like device and a second location.

BACKGROUND

It is a known problem that elderly, infirm, injured, handicapped, disabled, or otherwise mobility-impaired individuals often have trouble moving or being transported from one place to another. Such people will generally be referred to within this disclosure as "patients," but this term should be understood to include any individual as described above and anyone who may have need of a device to assist in moving from one place to another. Standard wheelchairs have been used for many years to accomplish this, but they have several deficiencies addressed by the present disclosure.

Standard wheelchairs generally have only a single, non-adjustable height. This lack of adjustability may make it difficult to move patients between the wheelchair and a second location, such as a bed, toilet, car seat, or any other place having a disparate height or that is difficult to reach with a standard wheelchair.

Further, standard wheelchairs often have a fixed back. This precludes loading and unloading via the rear side of the chair, necessitating more work and assistance from other people to move the patient to and from the wheelchair.

In addition to standard wheelchairs, other types of transporting apparatuses known in the art also have deficiencies addressed by the present disclosure.

One known apparatus uses a canvas sling that is placed under the patient and then hoisted from above. This device tends to take more than one assistant to operate and be uncomfortable for the patient. As the canvas is lifted from the corners, it tightens around the patient and can cause pain. It has been known even to cause bone problems, for example, in patients with osteoporosis. This type of apparatus may also lead to dropping the patient out of the canvas sling, causing further injury.

These and other limitations are present in known prior art devices having to do with the subject matter of the present disclosure.

SUMMARY

Therefore, a need has arisen for a way to transport elderly, infirm, injured, handicapped, disabled, or otherwise mobility-impaired individuals which allows them to move easily between destinations having disparate heights. It is an object of the present disclosure to provide such an apparatus. The apparatus of the present disclosure is small, easily transported, and capable of being operated by a single person. For example, one embodiment of the present disclosure is approximately 40 inches long, 27 inches wide, and 47 inches high (with a fully extended height of 65 inches). These compact dimensions allow the device to be easily moved in tight spaces and around corners as necessary. In other embodiments, a taller mechanism may be used to allow access to higher areas, at the sacrifice of some amount of compactness.

The device of the present disclosure has a seat that is adjustable in both height and tilt angle. In some embodiments, the present disclosure accomplishes this height adjustability through the use of a hydraulic lift cart. This arrangement may allow the seat to be adjusted between approximately 15 inches and approximately 33 inches in height in one embodiment. The use of different hydraulic lift carts may be employed to create embodiments that can lift farther, in order to reach higher locations. Other types of lifting mechanisms may also be used, including pneumatic actuators for example.

The seat of the disclosed device may also have an adjustable tilt angle to aid in loading and unloading. The seat may be made of a material that allows the occupant to slide easily. These materials include, but are not limited to, wood, plastic, fiberglass, structural foam, metal, etc. may be used.

The presently disclosed device uses a plurality of safety bars surrounding its occupant, around which may be attached straps for support. These straps provide all the support necessary, but they accomplish this without unduly confining the occupant or binding him to the apparatus. This arrangement may make the occupant more comfortable than prior art designs that tie or otherwise confine the occupant in the device.

This arrangement also allows the occupant to exit the device from the rear side, as is more convenient in some circumstances. For example, this feature may make it easier to move from the device into a car: the device may be backed up to the open door of a car, the strap(s) may be removed, and the occupant may slide off the back of the seat and into the car with minimal assistance from others. The adjustable tilt angle of the seat may also be used in such circumstances to facilitate loading and unloading.

A technical advantage of the disclosed devices is that they are able to move a patient between many different places, including but not limited to beds, toilets, cars, trucks, standard wheelchairs, etc. The devices of the present disclosure may be used to particular advantage in hospitals or retirement homes.

These and other advantages of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages included within this description, be within the scope of the claims.

BRIEF DESCRIPTION OF THE DRAWINGS

The features, nature, and advantages of the disclosed subject matter will become more apparent from the detailed description set forth below when taken in conjunction with the accompanying drawings, wherein:

FIGS. 8 and 9 show photographs of a prototype of an embodiment of the present disclosure in use, loading a patient into a car.

DETAILED DESCRIPTION

Although described with reference to specific embodiments, one of ordinary skill in the art could apply the principles discussed herein to other areas and/or embodiments. Those with skill in the art will recognize that the disclosed embodiments have relevance to a wide variety of areas in addition to those specific examples described below.

Figure 1:
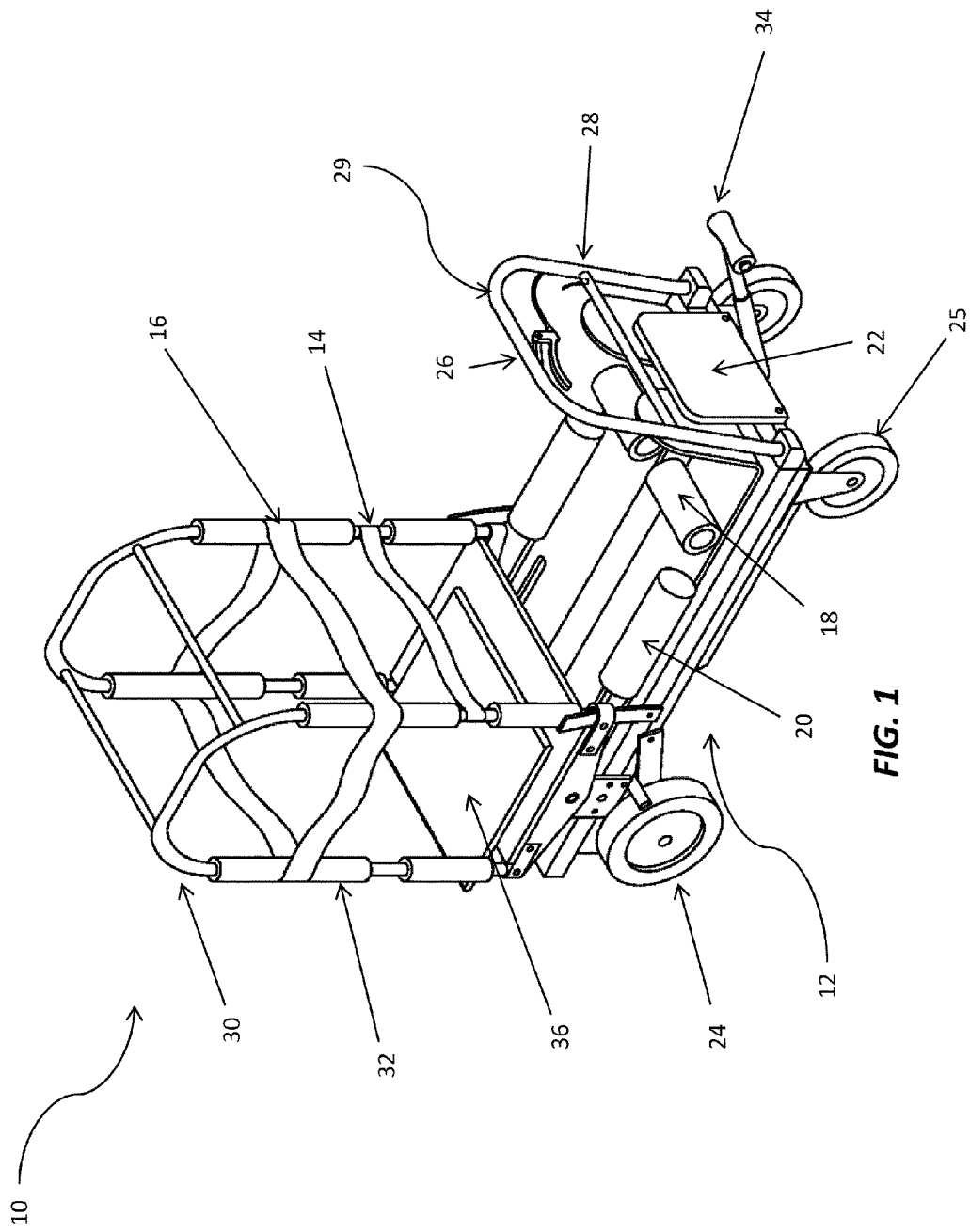
FIG. 1 shows an isometric view of an embodiment of the present disclosure.

FIG. 1 shows transporter 10, an exemplary embodiment of the present disclosure. Transporter 10 is built around a base comprising hydraulic lift cart 12, which may be any suitable standard lift cart. Hydraulic lift cart 12 is actuated by hydraulic handle 34, which causes the upper surface of the cart to lift relative to the wheels. Pressure may be released by squeezing bleed lever 26, lowering the height.

In the embodiment shown in FIG. 1, hydraulic lift cart 12 uses two different kinds of wheels: fixed wheels 24 in the rear and casters 25 in the front. This arrangement may allow for easier maneuverability, but it is not an essential element of the present disclosure. In one embodiment, both sets of wheels have a diameter of approximately 6 inches. The front wheels may be, but are not necessarily, the same size as the rear wheels. Wheels larger than 6 inches are possible as well, but wheels smaller than 6 inches may tend to cause the transporter to get caught on any unevenness the ground may have; small wheels may be particularly problematic on carpets. Because of the problem of clearance over obstacles, independent wheel axles may be preferable to unified axles running across the width of the transporter; unified axles may have a greater tendency to get caught on any unevenness or protrusions. The wheels may be locked in place by a braking mechanism (shown in more detail in FIG. 4), which is activated by brake lever 28. This feature is particularly helpful when getting into or out of the transporter device. Maneuvering handle 29 is provided so that an assistant, hospital orderly, or other person may maneuver transporter 10 into place. Maneuvering handle 29 may be made of any suitably strong material and coupled sturdily to hydraulic lift cart 12.

The occupant sits on seat 36, which may be made of wood, plastic, fiberglass, structural foam, metal, or any other suitable material. The seat material is preferably something over which the occupant may easily slide, facilitating loading and unloading. During normal operation, seat 36 may have a forward tilt angle of approximately 5 to 25 degrees, more preferably approximately 10 to 20 degrees. This tilt may help keep the patient securely seated in transporter 10 during motion.

Push-off plate 22 may be used by the patient when he is exiting through the rear of transporter 10. He may use his feet to push himself off using push-off plate 22, thereby reducing the amount of intervention needed from assistants and increasing his ability to autonomously exit the device.

Cage 30 surrounds the occupant, providing support and security, without unduly constraining or confining the occupant. Cage 30 also provides a structure that the occupant may hold onto. Cage 30 may be covered or partially covered with a soft material shown as foam 32. This may be made of any suitable material; standard pipe insulation has been found to be a suitable and low-cost option.

Removable strap 16 is disposed around cage 30, providing security without directly confining the occupant. Removable strap 16 may be removed when loading or unloading, and it may include a device allowing length adjustment to enable it to fit snugly around cage 30. Fixed strap 14 is disposed between the two front vertical members of cage 30, providing additional security and preventing the occupant from sliding forward too far. Both removable strap 16 and fixed strap 14 may be made of any suitable material; in some embodiments, nylon straps or straps of a seatbelt-like material have been found to be advantageous.

Transporter 10 also includes leg supports 20, which provide cushioning for the sides of the legs of the occupant and preventing lateral movement. This may add to the occupant's comfort as well as ensuring that he stays stably seated on transporter 10. Transporter 10 further includes ankle supports 18, disposed underneath the ankles of the occupant and satisfying the same basic purposes as leg supports 20: increasing stability and occupant comfort.

Figure 2:
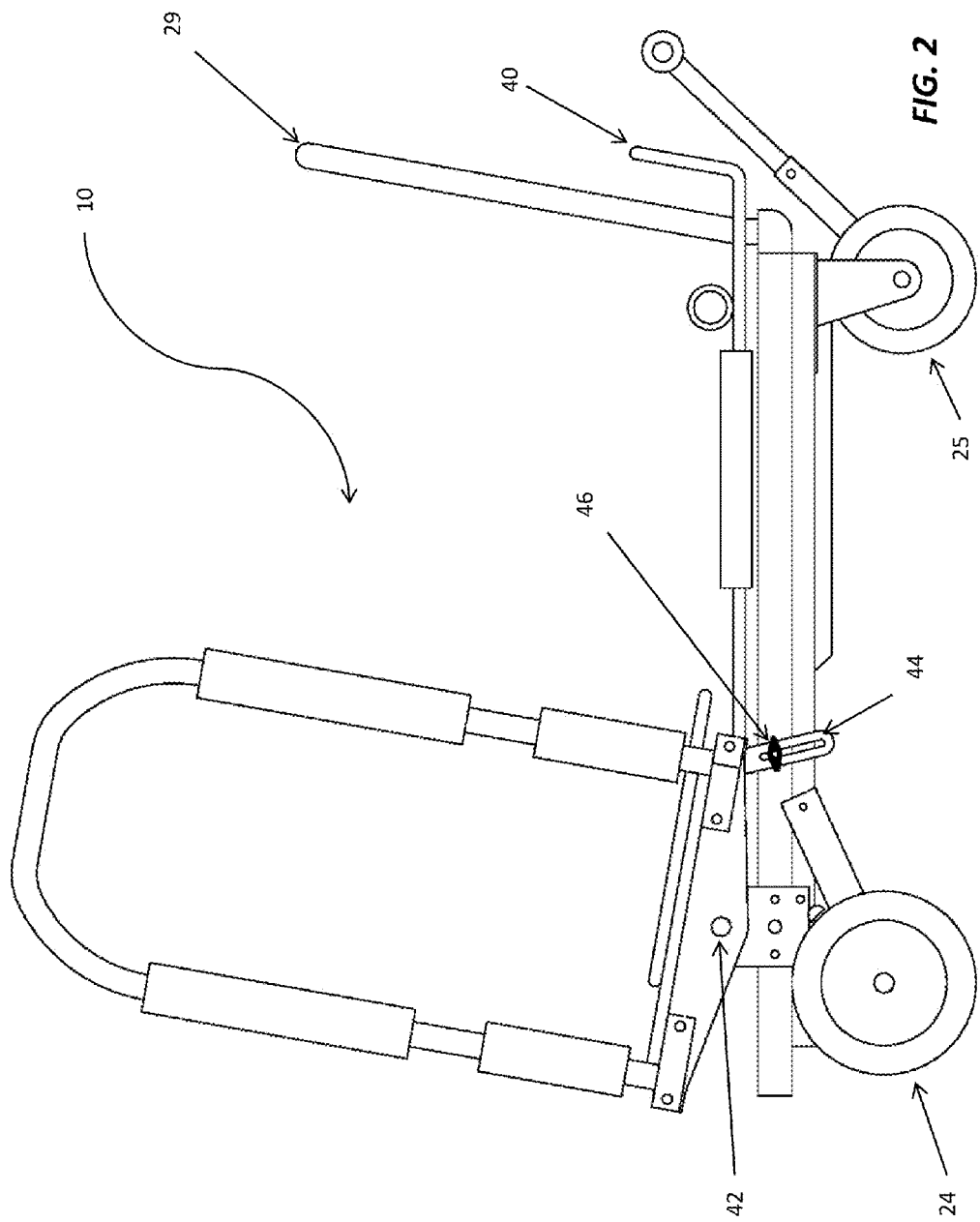
FIG. 2 shows a side view of an embodiment of the present disclosure.

FIG. 2 provides a side view of transporter 10, with removable strap 16 (not shown) removed. This view shows in more detail the mechanism for tilting the seat assembly (the seat assembly comprising seat 36, cage 30, the straps and foam attached to cage 30, and the hardware for connecting the assembly to the rest of transporter 10). The seat assembly is rotatably connected to hydraulic lift cart 12 by pivot 42. Pivot 42 may comprise a bolt on each side of transporter 10; alternatively, a single axle-type arrangement could also be used in place of separate bolts. Any suitable arrangement allowing the seat assembly to pivot forwards and backwards may be employed.

Adjustment plates 44 are connected to the seat assembly, one on each side of transporter 10. When locking knobs 46 are loosened, the seat may be pivoted to the desired angle, which slides adjustment plates 44 to a new position relative to hydraulic lift cart 12; locking knobs 46 may then be retightened, locking the seat securely in place. In some embodiments these knobs are adjustable by hand without the need for a wrench. This allows for quick adjustments to the tilt angle of the seat assembly, while still providing for security and stability once the desired angle has been reached. The four points of connection between the seat assembly and the rest of the apparatus (i.e. pivots 42 and adjustment plates 44) also allow for quick disassembly for transportation or storage of transporter 10.

FIG. 2 also points out foot supports 40. Foot supports 40 may be disposed at an angle that is comfortable for the occupant's ankles: in some embodiments, between approximately 5 and 25 degrees, or more particularly between approximately 10 and 20 degrees.

Figure 3:
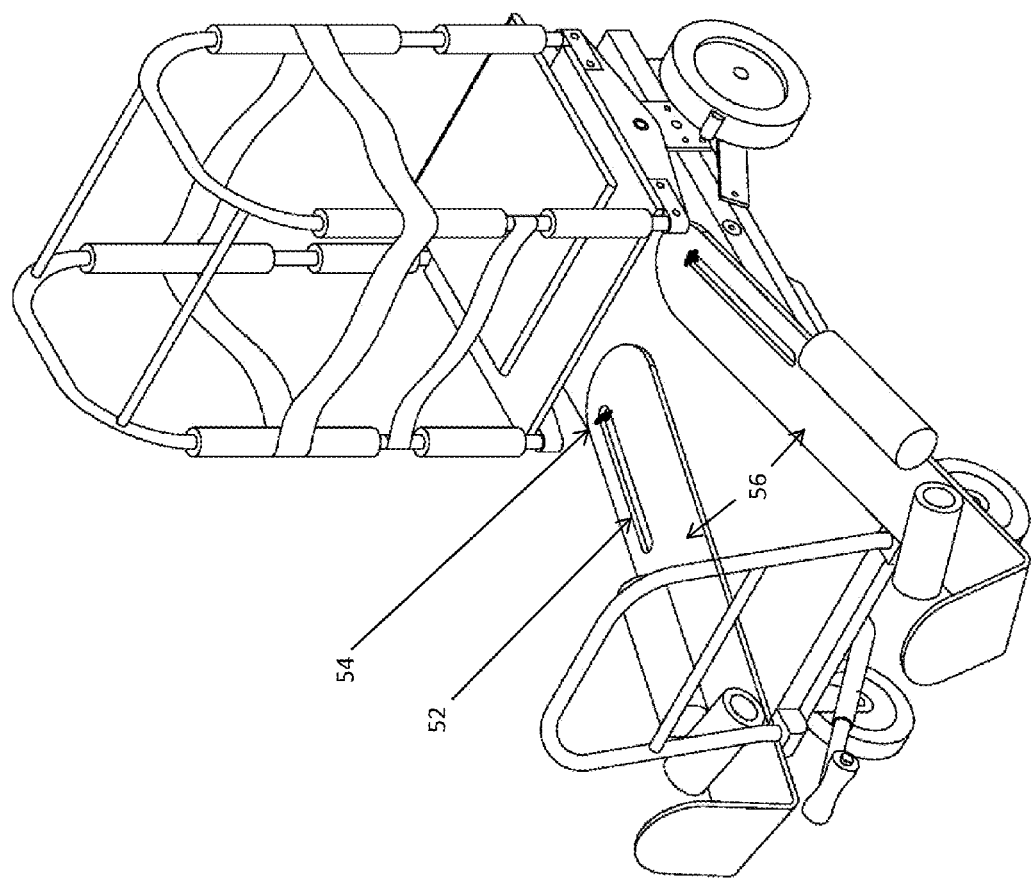
FIG. 3 shows an isometric view of an embodiment of the present disclosure demonstrating the adjustable leg pieces.

FIG. 3 demonstrates that leg pieces 56 may be adjusted to accommodate occupants of different heights and also allow occupants to sit with their legs spread as desired. Slots 52 are cut into leg pieces 56, allowing leg pieces 56 to be moved into the desired position before being secured by low-profile locking knobs 54. Low-profile knobs may be advantageous because they do not interfere with the tilting mechanism of the seat assembly, which in some embodiments may be in close proximity to low-profile locking knobs 54. For a person with longer legs, as shown, leg pieces 56 may be extended outwards around the handle of hydraulic lift cart 12.

This arrangement shown is also advantageous for another reason. Leg pieces 56 may easily be swapped out with different parts, tailored to the specific needs of the patient. For example, a patient with a broken leg may need that leg to be elevated: this may be easily accomplished by swapping out one of the leg pieces for an elevated leg piece. Other uses for this feature will be readily apparent to one of ordinary skill in the art.

Figure 4:
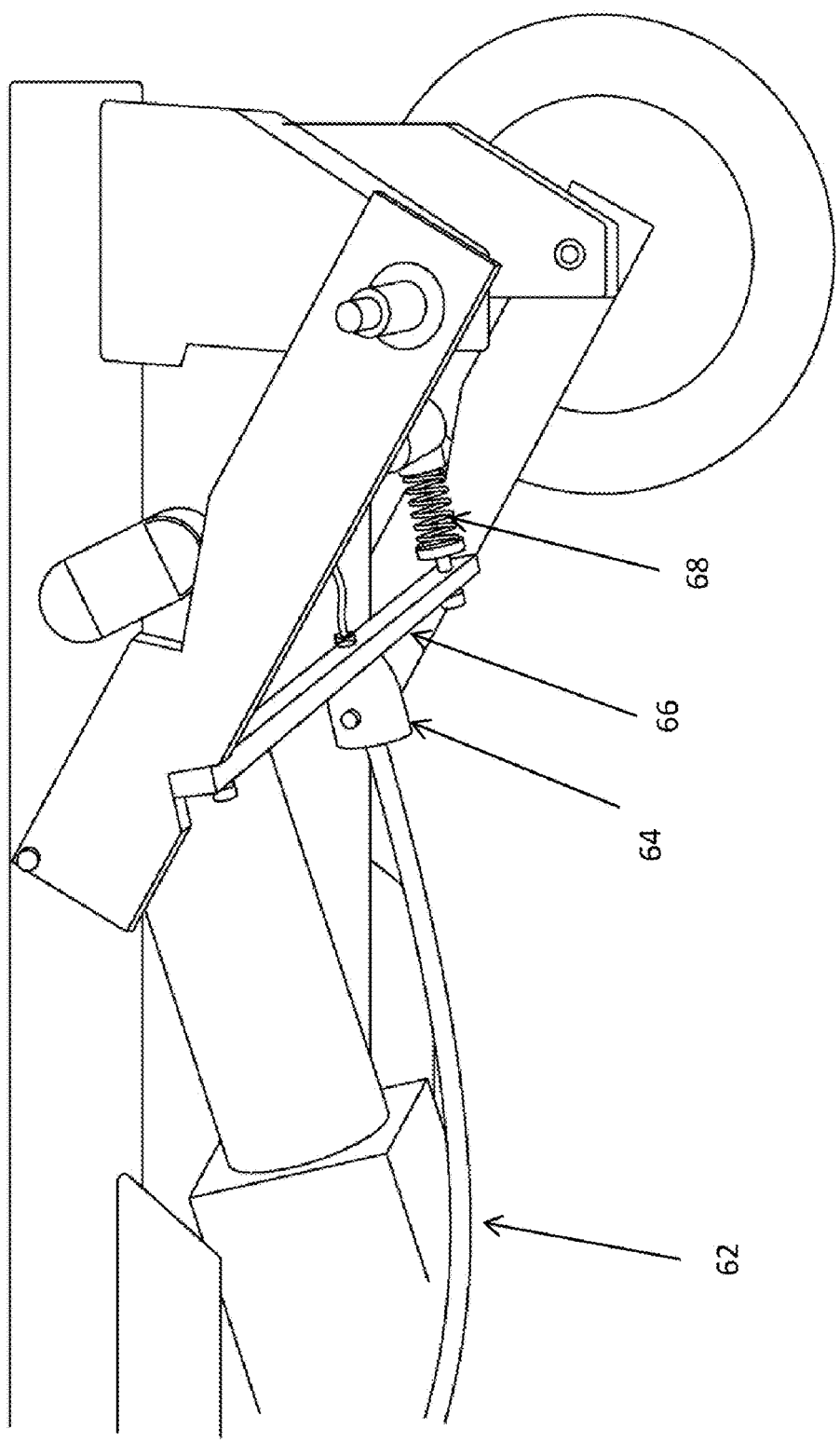
FIG. 4 shows a detail view of a braking mechanism on an embodiment of the present disclosure.

FIG. 4 shows a detail view of the braking mechanism of transporter 10. This braking mechanism is essentially used to lock the wheels in place during loading and unloading, rather than to slow down the transporter while it is in motion. However, in other embodiments, different braking arrangements could be used for that purpose as well.

As discussed in connection with FIG. 1, brake lever 28 actuates the braking mechanism in transporter 10. Brake lever 28 in this embodiment is connected to linkage 62 in FIG. 4. Linkage 62 is a standard flex cable inside a cable housing, similar to the type of arrangement used in bicycle braking mechanisms; however, other types of braking mechanisms will be apparent to one of ordinary skill in the art. Linkage 62 moves brake bar 66 against the force of springs 68, in turn applying pressure against the wheels. Terminator 64 may be used to set the zero-point of the brake travel, so that brake bar 66 undergoes the correct travel when brake lever 28 is actuated.

Figure 5:
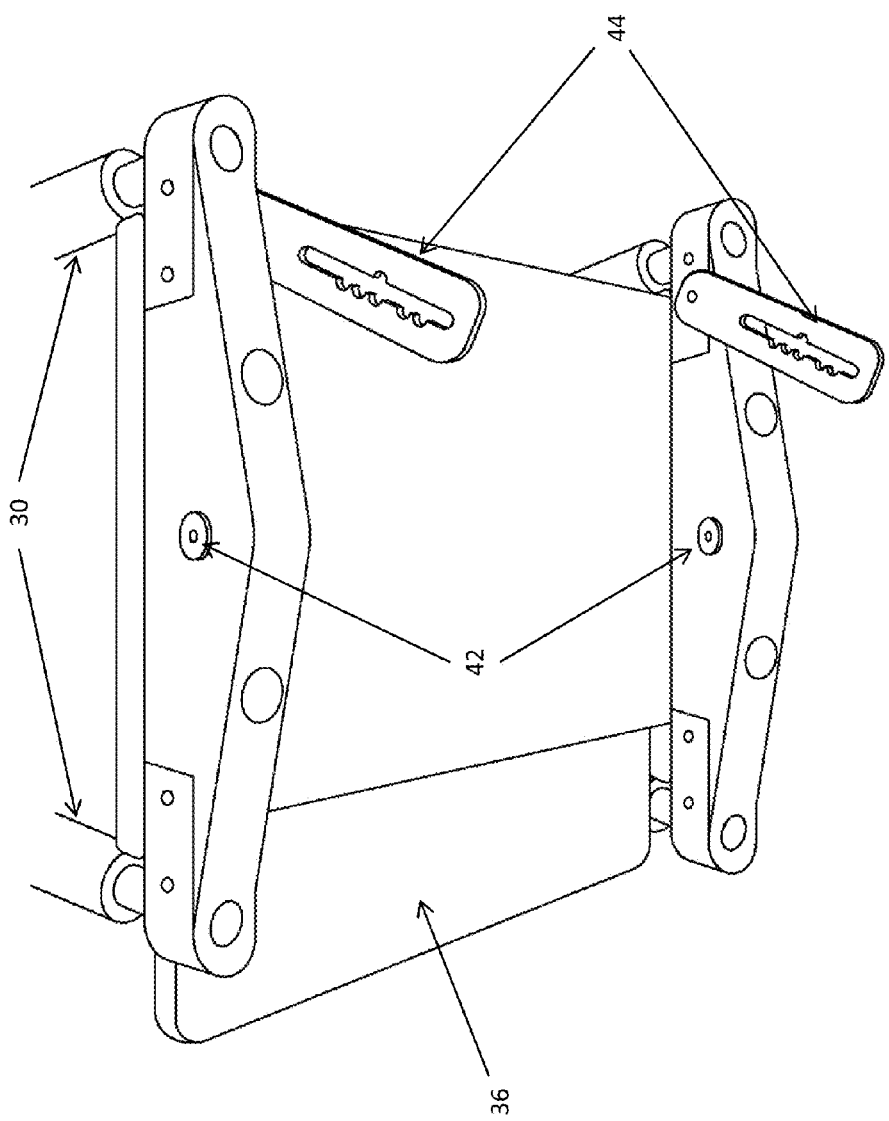
FIG. 5 shows a detail view of the detached seat assembly of an embodiment of the present disclosure.

FIG. 5 shows a detail view from the bottom of the seat assembly, which has been removed. It may be desirable to remove the seat assembly from the rest of the transporter, for example, in order to load it into a car. As shown, the seat assembly is supported by pivots 42 and adjustment plates 44. Adjustment plates 44 may or may not have detents to assist in securing the seat assembly at the desired tilt angle.

Figure 6:
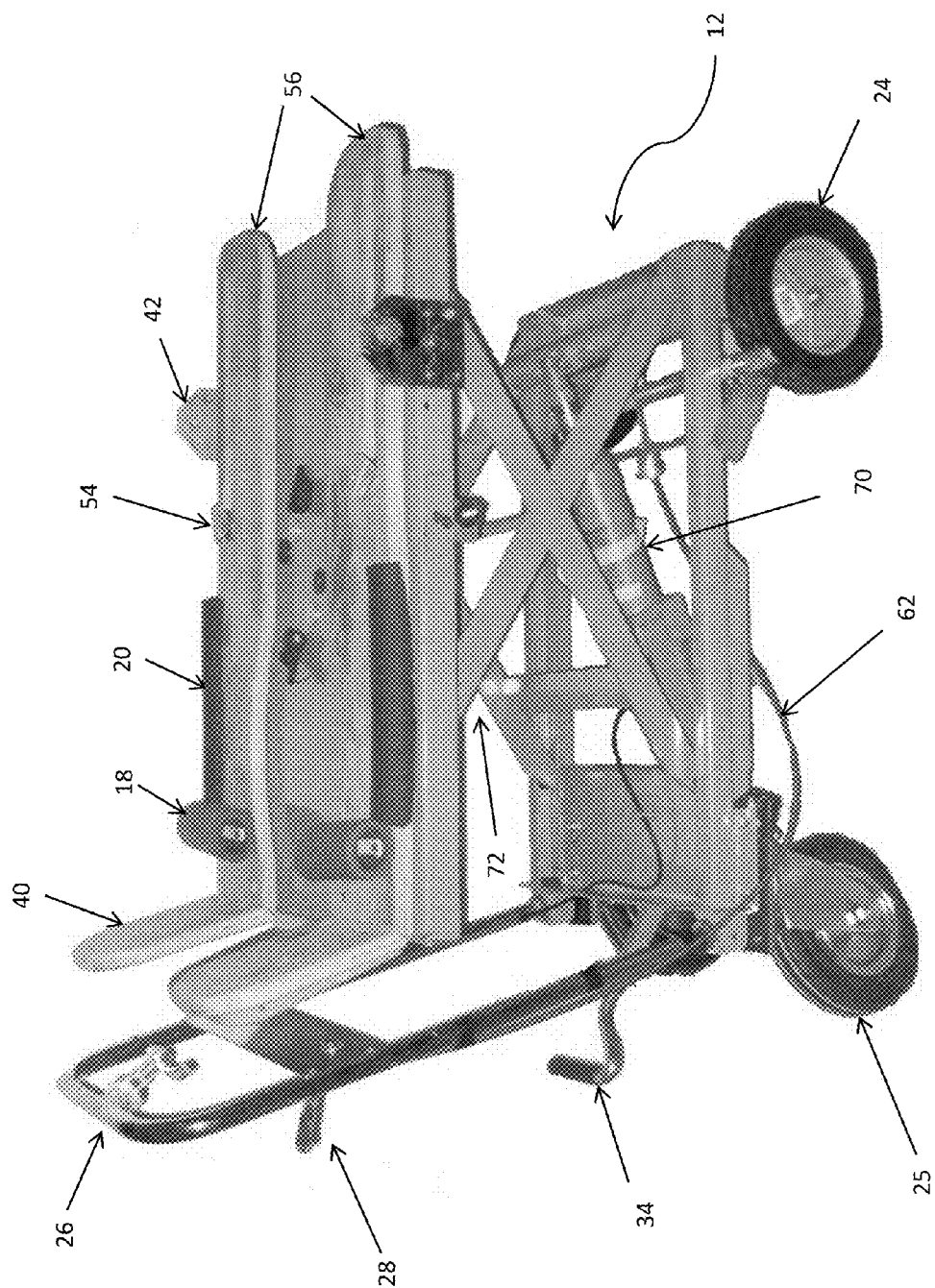
FIG. 6 shows a photograph of a prototype of an embodiment of the present disclosure with the seat assembly removed.

FIG. 6 shows a photograph of a prototype of an embodiment of transporter 10 with the seat assembly removed and the hydraulic lift cart in a raised position. Pivots 42 show where the seat assembly would be attached. This type of disassembly of transporter 10 may allow for easy transportation of the device.

As discussed above, the device rides on fixed wheels 24 and casters 25. Hydraulic handle 34 and bleed lever 26 control the height of the liftable platform. Brake lever 28 locks the wheels in place via linkage 62 to allow stable and safe ingress and egress to the device. Low-profile locking knobs 54 fit into grooves cut into leg pieces 56, allowing leg pieces 56 to move to a desired position and be locked in place. Foot supports 40, leg supports 20, and ankle supports 18 hold the occupants legs securely and comfortably in place.

As shown, hydraulic cylinder 70 lifts the top portion of hydraulic lift cart 12 by way of scissor mechanism 72. Many different lifting mechanisms will be apparent to one of ordinary skill in the art, and could be employed in place of hydraulic cylinder 70 and scissor mechanism 72 without departing from the spirit of the present disclosure. For example, another type of pressure cylinder such as a pneumatic cylinder could be used, or a motorized mechanism could be used. The embodiment shown, with hydraulic cylinder 70 may be advantageous because it is sturdy and may be actuated (via hydraulic handle 34) without an excessive amount of force.

Figure 7:
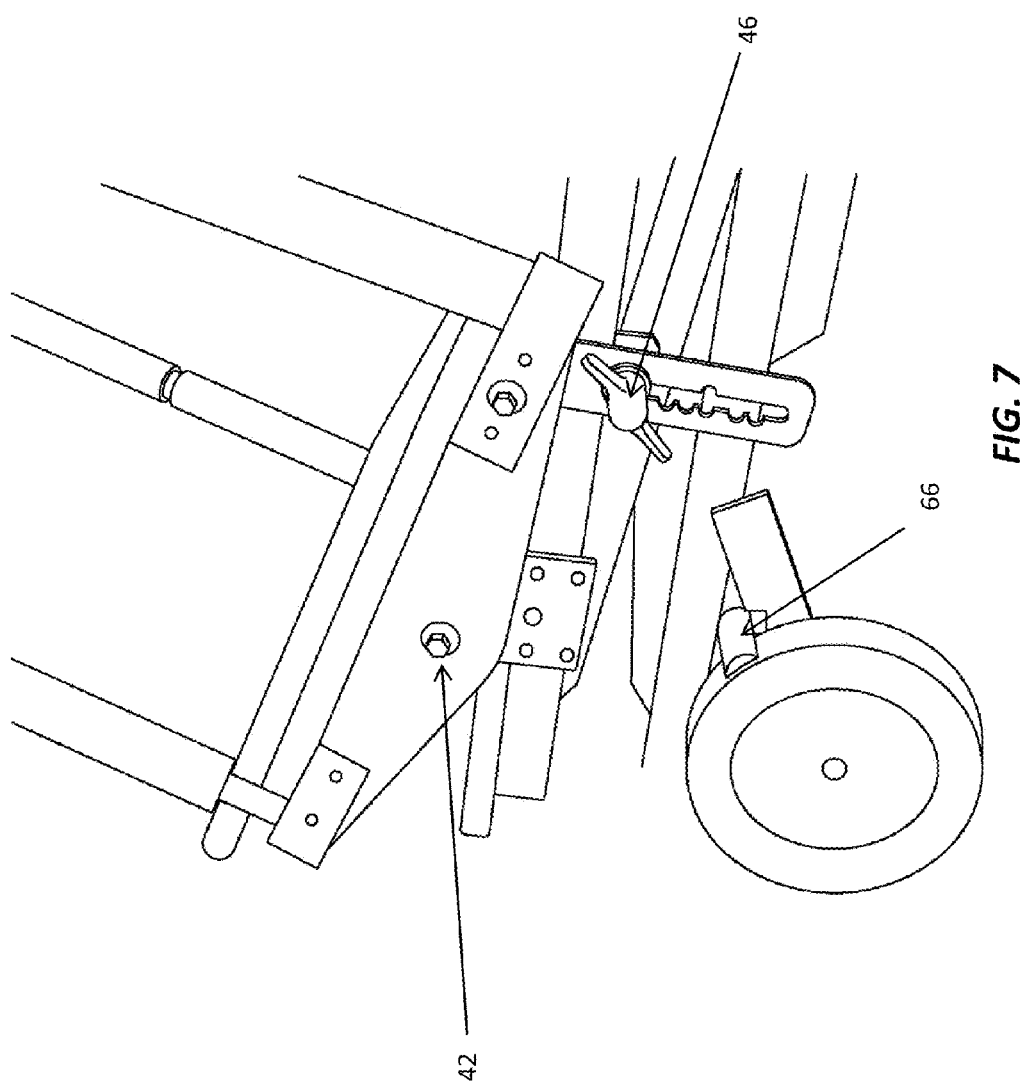
FIG. 7 shows a detail views of the mechanism for attaching a seat.

FIG. 7 shows a detail view of the tilt mechanism of the seat assembly. As described above, locking knobs 46 secure adjustment plates 44, allowing the entire seat mechanism to rotate about pivots 42.

This ability to pivot the entire seat assembly greatly increases the utility of the disclosed devices. A forward tilt angle allows the occupant to sit comfortable and securely during movement, and a backward tilt angle allows easy ingress and egress to the device.

FIGS. 8 and 9 show photographs of a prototype of an embodiment of the present disclosure in use. As shown, the device may be adjusted in height and tilt to match the configuration of a car seat. Then the support straps may be removed, and the occupant may easily exit through the rear side of the device into the car. The seat assembly in these photographs is tilted toward the rear to allow easier egress into the car seat. The occupant is able to push off of the push-off plate and maneuver himself into the car without assistance.

The foregoing description of the exemplary embodiments is provided to enable any person skilled in the art to make and use the subject matter. Various modifications to these embodiments will be readily apparent to those skilled in the art, and the generic principles defined herein may be applied to other embodiments without the use of the innovative faculty. Thus, the subject matter claimed is not intended to be limited to the embodiments shown herein but is to be accorded the widest scope consistent with the principles and novel features disclosed herein.

It is intended that all such additional systems, methods, features and advantages that are included within this description, be within the scope of the claims.

What is claimed is:

1. A transporting device comprising:
a liftable platform, said liftable platform actuated by a pressure cylinder;
a plurality of wheels coupled to a bottom side of said liftable platform;
a maneuvering handle coupled to said liftable platform;
a brake coupled to at least one of said plurality of wheels;
a brake lever disposed on said maneuvering handle and coupled to said brake by a brake cable;
a pressurizing handle coupled to said pressure cylinder for pressurizing said pressure cylinder;
a bleed lever coupled to said pressure cylinder for releasing pressure from said pressure cylinder;
a pivotable seat assembly coupled to a top side of said liftable platform via a pivot, said seat assembly comprising:
a seat;
a cage coupled to said seat, said cage comprising a plurality of substantially vertical members and a plurality of substantially horizontal members;
a strap removably coupled to said cage;
at least one adjustment plate coupled to said seat assembly and movably coupled to said liftable platform via a locking knob, providing a locking mechanism for said pivotable seat assembly;
at least one leg piece adjustably coupled to said top side of said liftable platform via a low-profile locking knob.

2. The transporting device of claim 1, wherein said plurality of wheels comprises at least one fixed wheel and at least one caster.

3. The transporting device of claim 1, wherein said at least one leg piece comprises two leg pieces adjustably coupled to said top side of said liftable platform via a first low-profile locking knob and a second low-profile locking knob.

4. The transporting device of claim 3, wherein each of said two leg pieces further comprises a lateral leg support.

5. The transporting device of claim 4, wherein each of said lateral leg supports comprises foam.

6. The transporting device of claim 5, wherein each of said two leg pieces further comprises an ankle support.

7. The transporting device of claim 6, wherein each of said ankle supports comprises foam.

8. The transporting device of claim 1, wherein said seat assembly further comprises at least one strap non-removably coupled to said cage.

9. The transporting device of claim 1, wherein said cage further comprises a foam covering on said substantially vertical members.

10. The transporting device of claim 1, wherein said seat comprises a hard material.

11. The transporting device of claim 10, wherein said hard material comprises wood.

12. The transporting device of claim 1, wherein each of said plurality of wheels has a diameter of at least approximately 6 inches.

13. The transporting device of claim 1, further comprising a push-off plate coupled to said maneuvering handle.

14. The transporting device of claim 1, further comprising a push-off plate coupled to said liftable platform.

* * * * *